(12) United States Patent  (10) Patent No.: US 7,249,134 B2
Simonin  (45) Date of Patent: Jul. 24, 2007

(54) METHOD OF MODELLING REFERENCE DATA AND USE OF THIS METHOD FOR LOCALIZATION OF REFERENCE DATA IN AN INFORMATION SYSTEM

(75) Inventor: Jacques Simonin, Valenciennes (FR)

(73) Assignee: France Telecom, Paris (FR)

( * ) Notice: Subject to any disclaimer, the term of this patent is extended or adjusted under 35 U.S.C. 154(b) by 645 days.

(21) Appl. No.: 10/834,172

(22) Filed: Apr. 29, 2004

(65) Prior Publication Data

US 2004/0236766 A1  Nov. 25, 2004

(30) Foreign Application Priority Data

Apr. 29, 2003  (FR) .................................... 0305268

(51) Int. Cl.
  *G06F 7/00*  (2006.01)
(52) U.S. Cl. ...................................... 707/100; 707/101
(58) Field of Classification Search .................... 717/1, 717/5, 7, 126; 707/100, 101, 102, 1, 10
  See application file for complete search history.

(56) References Cited

U.S. PATENT DOCUMENTS 7,019,740 B2 *  3/2006  Georgalas ................... 707/100
7,159,209 B1 *  1/2007  Srinivasan et al. ......... 717/126

* cited by examiner

*Primary Examiner*—Wilson Lee
(74) *Attorney, Agent, or Firm*—Miles & Stockbridge P.C.; Edward J. Kondracki

(57) ABSTRACT

The invention relates to a method of modeling reference data in an information system (IS), characterized in that it is based on a Unified Modeling Language (UML) model of reference data for the IS listed in deposits of application data for the IS. Any reference data in the IS is defined by a specialized concept inheriting the characteristics of a generic concept. The method comprises steps in which the following actions are carried out:

grouping the concepts into categories according to logical criteria;
  building a categories diagram in which the categories are grouped according to a predefined typing of categories, wherein the categories are related to each other by UML dependence relations, each materialized in one reference data;
  making groups of generic concepts in the same category consistent with deposits of application data in the IS by applying the principle according to which reference data defined by specialized concepts inheriting generic concepts in a same category and possessing an identical specialization necessarily belong to the data deposit of a unique application; and
  defining a direction for UML dependence relations relating the said categories to each other, the said direction of UML dependence relations depending firstly on typing of categories, and secondly on the deposit of the reference data containing the relation.

33 Claims, 3 Drawing Sheets

METHOD OF MODELLING REFERENCE DATA AND USE OF THIS METHOD FOR LOCALIZATION OF REFERENCE DATA IN AN INFORMATION SYSTEM

BACKGROUND OF THE INVENTION

1. Field of the Invention

This invention relates to a method of modeling reference data in an information system (IS) and an algorithm based on this modeling in order to localize deposits of reference data for an information system.

Therefore, the invention relates to the domain of software techniques.

2. Description of the Related Art

In an organization, an IS is composed of the set of all elements that contribute to the processing and circulation of information in the organization (database, application software, procedures, documentation, etc.) including the information system itself (central processing unit, peripherals, operating system, etc.). Therefore, the IS is composed of the human and technical means necessary for the storage and processing of information in an organization.

An IS is modeled in the IS design phase and it consists of creating a virtual representation of processes used by businesses in an organization and information stocks and flows providing input to these processes.

One known method called MERISE is the most widespread method used for designing an information system. It is a computer analysis method dedicated to setting up an IS. The MERISE method is based on separation of data and processing to be done in several conceptual and physical models. Among these models, the Conceptual Data Model (CDM) is used to set up a clear representation of IS data and defines functional dependences of these data between themselves. The purpose of the CDM is to formally write data that will be used by the IS. Therefore, it is an easily understandable representation of data used to write the IS using entities. An entity is the representation of a material or immaterial element that plays a role in the system that is to be described. Entities of the same type, in other words with the same definition, are grouped within a set called an entities class. Semantic links may exist between several entities. Thus, relations are defined to represent these semantic links and a relation class contains all relations of the same type (therefore that connect entities belonging to the same entity classes).

However, data modeling proposed in a Conceptual Data Model originating from the MERISE method cannot be used to translate the concept of the reference value of a data item or a reference relation between two items of data.

The concept of IS reference data relates to data produced by an application that supplies official values for these data. This concept of reference data is extremely important in an IS, particularly when it is required to create or update the urbanism of an IS. Data are often manipulated through several applications and their values can thus be modified by the different players involved in the IS. Moreover, if an IS is to remain efficient or if its services are to be improved, it must necessarily progress at the same rate as the organization develops and its strategy changes. Urbanism work then consists of defining the main lines of these developments and continuous changes, and setting up a simpler interconnection between the different systems and applications of the IS.

In this context, the concept of a reference value for a data item or a relation between two data items is very important to optimize urbanism of an IS. Each application of an IS that has reference data in its data deposit must be capable of offering these reference data to client applications. Obviously, this concept of a data offer by a supplier to customers has an influence on the functional urbanism of the IS.

The Conceptual Data Model derived from the MERISE method is incapable of representing homogenous data groups or dependence relations between these groups, although these are useful for representing the concept of reference. This method does not enable construction of a model using principles based on IS reference data and is therefore limited in terms of optimizing the functional urbanism phase of an IS.

Moreover, modeling of data proposed in a Conceptual Data Model derived from the MERISE Method is also limited in that it cannot locate deposits of reference data for new data in an IS. However, this is a very important characteristic necessary to optimize urbanism of an IS.

Thus, considering the above, one purpose of this invention is to propose a method for modeling data of an IS that overcomes the disadvantages of prior art as mentioned above, and particularly that is capable of defining a diagrammatic representation of the concept of a reference value of a dependence relation between two items of data and data themselves.

Another purpose of this invention is to propose a method for localizing deposits of reference data for new data in an IS, to support principles of the proposed modeling method, that determines which data deposit contains a reference data item, in other words the particular application responsible for the data.

SUMMARY OF THE INVENTION

To achieve this, the invention proposes to apply the concept of a UML (Unified Modeling Language) object model, to modeling of reference data for an information system.

Therefore, the invention relates to a method of modeling reference data in an information system, characterized in that it is based on a UML model of reference data for the information system listed in deposits of application data for the IS, any reference data in the information system being defined by a specialized concept inheriting the characteristics of a generic concept, the said method comprising steps in which the following actions are carried out:

group the said concepts into categories according to logical criteria;

build a categories diagram in which the said categories are grouped according to a predefined typing of categories, the said categories being related to each other by UML dependence relations, each materialised in one or several reference data;

make groups of generic concepts in the same category consistent with deposits of application data in the information system by applying the principle according to which reference data defined by specialised concepts inheriting generic concepts in a same category and possessing an identical specialization necessarily belong to the data deposit of a unique application;

define a direction for UML dependence relations relating the said categories to each other, the said direction of UML dependence relations depending firstly on typing of categories, and secondly the deposit of the reference data containing the relation.

According to one characteristic of the invention, the group of categories according to a predefined typing consists of defining categories related to flows grouping generic concepts and specialized concepts that have a life cycle exactly corresponding to the life cycle of a process, categories related to stocks grouping generic concepts and specialized concepts that change state after a flow has been activated and that have a life cycle not limited to the life cycle of a process, and code categories grouping generic concepts used to reference information related to flows or stocks.

Preferably, a UML dependence relation between a flow type category and a stock type category is in the direction from the flow type category to the stock type category.

Preferably, a UML dependence relation between a flow type category or a stock type category and a code type category is in the direction from the flow type category or the stock type category to the code type category.

In one embodiment according to which two reference data are related to each other, the said relation resulting in a UML dependence relation between the categories to which the two generic concepts from which the specialized concepts corresponding to the said reference data are inherited belong, the direction of the said UML dependence relation is determined such that the starting point is the category to which the generic concept corresponding to the reference data for which the data deposit comprises the reference data containing the relation between the said two reference data belongs.

The invention also relates to a method for localizing deposits of reference data in an information system, characterized in that it includes a step for using a model of reference data in the information system according to the principles defined above and in that it includes the following steps consisting of defining an ordered path for the categories diagram, and localizing the reference data deposit associated with the said category.

According to one embodiment, the ordered path of the diagram is made from flow type categories to code type categories.

Advantageously, the method includes the following steps consisting of:

for each flow type category, reiterating the following steps:
localize the reference data deposit associated with the said flow type category;
for each stock type category that is the target of at least one dependence relation originating from the said flow type category, reiterate the following steps:—localize the reference data deposit associated with the said stock type category and give priority to the choice of the reference data deposit associated with the said flow type category, and;—for every stock type category that is the target of at least one dependence relation originating from the said stock type category, localize the reference data deposit associated with the said other stock type category and give priority to the choice of the reference data deposit associated with the said stock type category;
for each code type category that is the target of at least one dependence relation originating from the said flow type category, reiterate the following steps:—localise the reference data deposit associated with the said code type category and give priority to the choice of the reference data deposit associated with the said flow type category;
for each stock type category, reiterate the following steps:
for each code type category that is the target of at least one dependence relation originating from the said stock type category, reiterate the following steps:—localize the reference data deposit associated with the said code type category and give priority to the choice of the reference data deposit associated with the said stock type category, and;—for every code type category that is the target of at least one dependence relation originating from the said code type category, localize the reference data deposit associated with the said other code type category and give priority to the choice of the reference data deposit associated with the said code type category;

According to one characteristic of the invention, the step consisting of localizing the reference data deposit associated with a category consists of designating the application responsible for storage of the reference data related to the said category.

BRIEF DESCRIPTION OF THE DRAWINGS

Other characteristics and advantages of the invention will become clear after reading the following description that is given for guidance and is in no way limitative, with reference to the following figures among which.

DESCRIPTION OF THE PREFERRED EMBODIMENTS

Therefore, UML is a modeling tool based on an object approach. This type of modeling may also appear inappropriate a priori when it is required to manipulate data, since in this case the functional approach is more intuitive. But in fact one of the main principles of the invention is that it is contrary to this preconception, in that it applies concepts specific to the UML notation to modeling reference data for an IS.

Therefore, the invention is intended to make a UML model of data in an IS that is consistent with urbanism of reference data for an IS. In this context, any data in an IS may be interpreted as the implementation of a specialized concept (UML class stereotype). The specialized concepts defined in an IS inherit a generic concept (UML class stereotype). Specialization of a generic concept is then a characteristic of the urbanism of an IS.

Specialization is a concept related to inheritance in the UML notation. More specifically, inheritance is a relation between classes that enables the definition and implementation of a class based on other existing classes. The inheritance relation also enables a class to reuse attributes and methods defined for a more general class.

For example, considering the context of a company, a generic concept entitled an order line can be defined. In a first case, this order line may be specialized by segmentation of the clientele market (company, general public) or by the technology of products or services in the company's commercial catalogue (analogue, digital, etc.).

The invention has the objective of advantageously using an UML possibility of making homogenous groups of data. The different concepts defined are thus grouped in categories according to logical criteria. These categories may be represented using the UML packeting concept.

Figure 1:
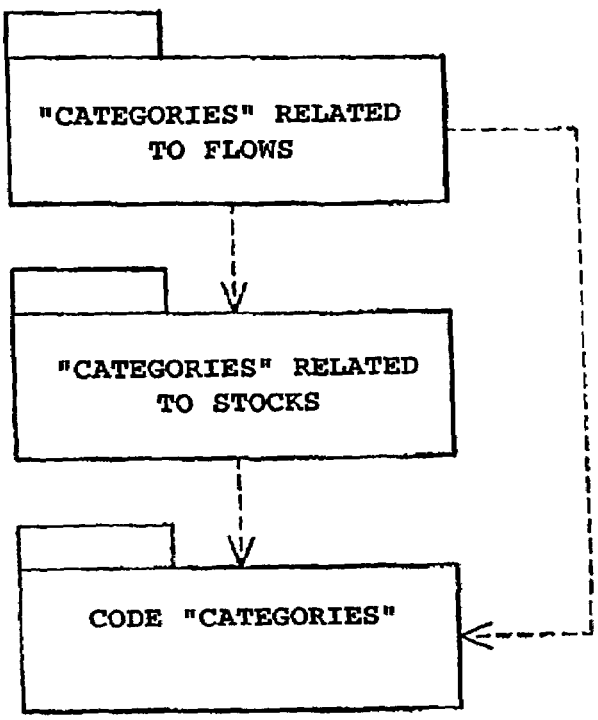
FIG. 1 is a diagram using the UML packeting notation and illustrating the principle of modeling categories according to this invention.

One important characteristic of the invention then consists of building a categories diagram in which categories are grouped according to a predefined typing of these categories. This typing of categories of an IS according to the invention, and therefore the concepts contained in it or data corresponding to specialized concepts, is defined as follows with relation to FIG. 1:

Categories related to flows that group generic concepts and specialized concepts with a life cycle that precisely corresponds to the life cycle of a process (for example Order, Invoice type categories);

Categories related to stocks, that group generic concepts and specialized concepts that change state following activation of a flow and with a life cycle not limited to the life cycle of a process (for example the Customer, Customer Fleet, Customer Account type categories);

Code categories that group generic concepts used to reference information related to flows or stocks (for example a Commercial Catalogue type category).

With reference to FIGS. 2 to 5, a first embodiment of the invention is described using the UML data modeling in order to describe reference data for an existing IS and deposits of these data. In this example, the IS corresponds to the IS of a company, and a data deposit means any location of data that could constitute a valuable information source, such as company databases, files, etc.

This embodiment of the invention is that of an existing IS in which the description of reference data and their deposits is necessary, for urbanism reasons.

The flow studied in this example is the flow of an order from a supplier, by a customer who already has a fleet from this supplier and therefore has an account with him. Like the commercial fleet, the order is referenced through a commercial catalogue.

Figure 2:
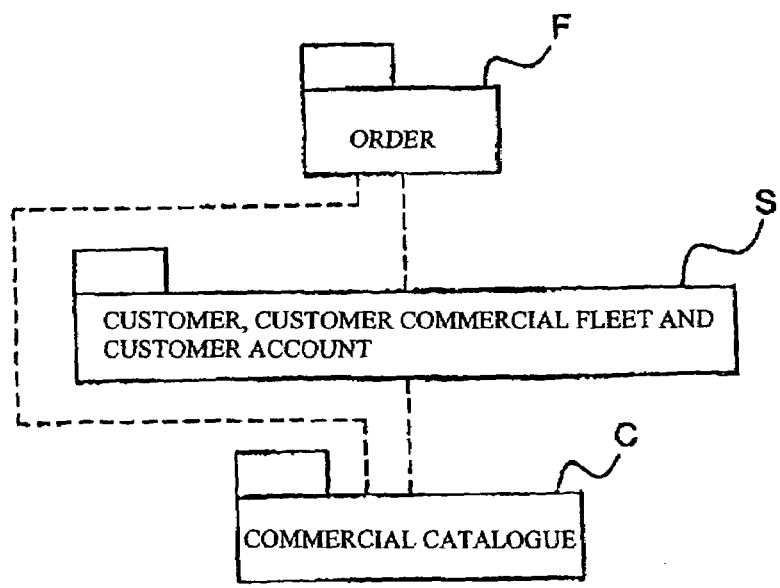
FIG. 2 is a diagram using the UML packeting notation and illustrating an example of a categories diagram according to the invention.

Starting from typing of categories proposed by this invention, a first diagram of the manipulated categories is obtained with reference to FIG. 2:

A flow type category F is defined as being the Order category, a stock type category S is defined as being the Customer, Customer Commercial Fleet and Customer Account category, and a code type category C is defined as being the Commercial Catalogue category.

The various categories thus defined are related to each other on the diagram by UML dependence relations, each materialized by one or several reference data for an IS. UML dependence relations are diagrammatically represented by dashed lines in the figures.

Once categories have been grouped in this way by typing, one essential characteristic of the invention consists of making groups of generic concepts in a same category consistent with IS application data deposits. This operation to create consistency is defined by applying the principle according to which reference data defined by specialized concepts inherited generic concepts in a same category and with exactly the same specialization necessarily belong to the data deposit for one and only one application.

In our example, the category related to stocks S contains specialized concepts for which the corresponding reference data belong to different deposits in the IS. The reference data related to the Customer are in the supplier's customer management application, data related to the Customer Commercial Fleet are located in order applications specific to the technology, and data related to the Customer Account are located in an invoicing application.

Figure 3:
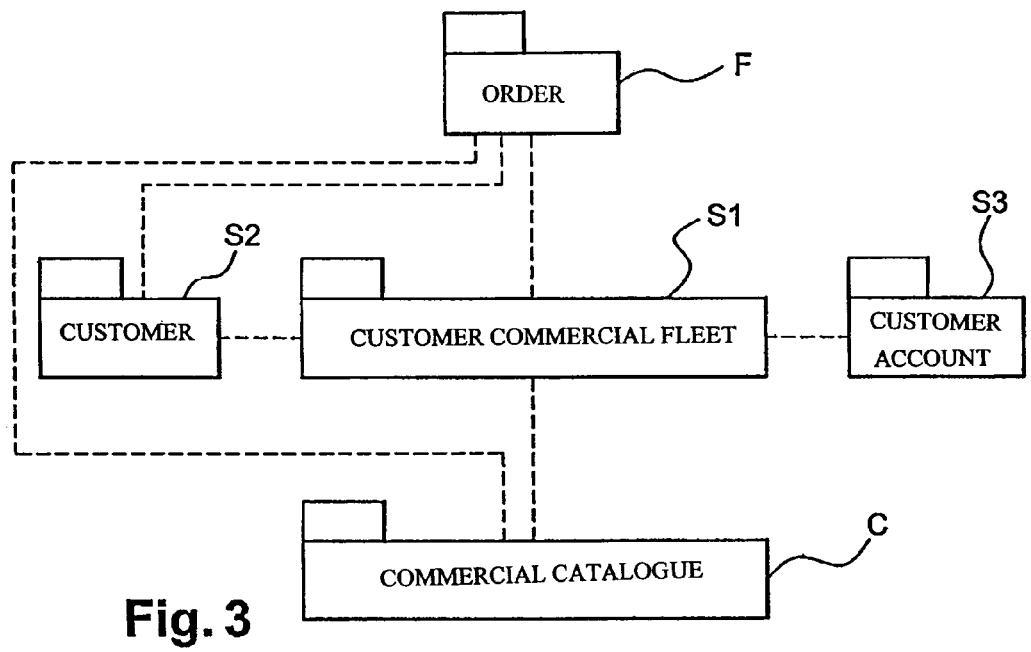
FIG. 3 is a diagram using the UML packeting notation and illustrating the example of a categories diagram in FIG. 2 at a later stage of modeling according to the invention.

Starting from the principle described above, the definition of categories is like that shown in FIG. 3:

A category related to flows F: Order

Three categories related to stocks S1, S2 and S3, entitled Customer Commercial Fleet, Customer and Customer Account respectively.

A code category C: Commercial Catalogue.

Thus according to the invention, generic concepts belonging to the same category must define reference data belonging to the same data deposit, in other words the deposit of a single application.

Another important step for the method according to the invention consists of defining a direction for UML dependence relations relating categories together. The orientation of relations between categories, which in the past depended on relations between data in the IS being studied, is firstly related to typing of these categories.

Thus according to the invention, the orientation of relations starting from typing is defined as follows: a UML dependence relation between a flow type category and a stock type category is in the direction from the flow type category towards the stock type category, and a UML dependence relation between a flow type category or a stock type category and a code type category is in the direction from the flow type category or the stock type category towards the code type category.

Figure 4:
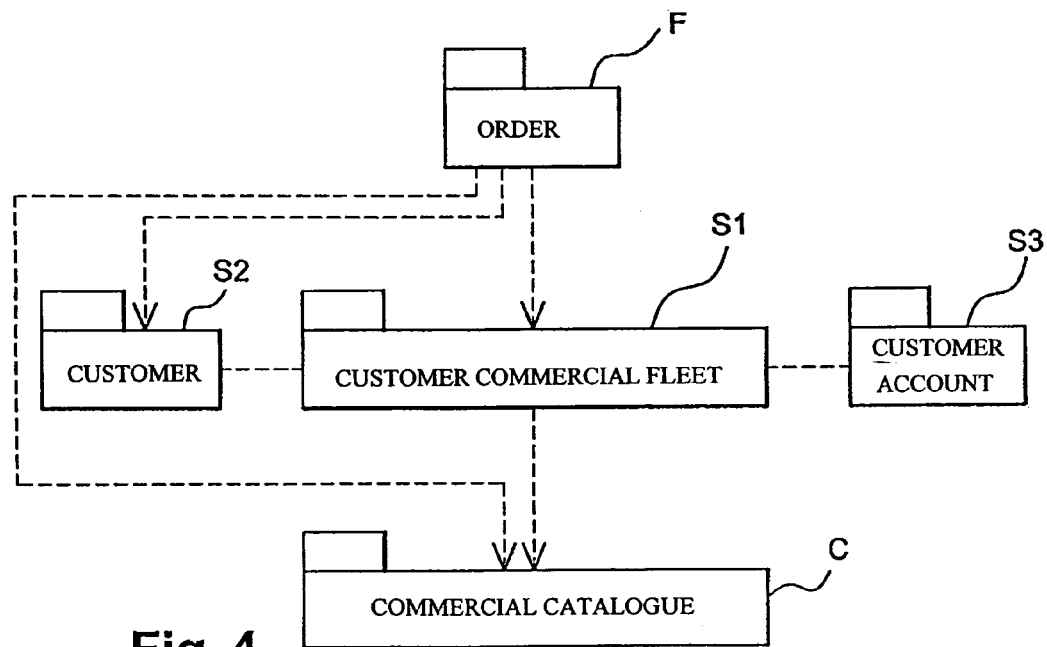
FIG. 4 is a diagram using the UML packeting notation and illustrating the example of the categories diagram oriented depending on the type.

Based on these principles, the oriented categories diagram in FIG. 4 is obtained. Thus, the orientations of UML dependence relations ending with the order flow type category F represent this flow type category as the starting point. In dependence relations with the Order category taken as the starting point, the stock type category S1 Customer Commercial Fleet, stock type category S2 Customer and the code type category C Commercial Catalogue are target categories.

Similarly, the starting point of the dependence relation between category S1 Customer Commercial Fleet and category C Commercial Catalogue is the stock type category, namely the category S1 Customer Commercial Fleet.

Finally, the direction or the orientation of a UML dependence relation between categories also depends on the deposit of reference data containing the relation.

If two reference data are related to each other, this relation is translated by a UML dependence relation between the categories to which two generic concepts for which the specialized concepts corresponding to the said reference data inherit, belong. According to the invention, the UML dependence relation is then oriented such that its starting point is the category to which the generic concept corresponding to the reference data for which the data deposit comprises the reference data containing the relation between the two reference data, belongs. In other words, if the reference data containing the relation between two reference data D1 and D2 is in the same deposit as the reference data D1, then the dependence relation between the corresponding generic concepts, CG1 for D1 and CG2 for D2 is in the direction from CG1 to CG2. Thus, the application in which the deposit of reference data D2 is localized must offer the data, for example through a service, to the application containing the reference data D1 in its deposit, and not the inverse.

The concept of a reference for a relation between data is then translated like a UML dependence relation oriented between generic concepts under the responsibility of the generic concept from which the dependence relation originates. This orientation between generic concepts immediately affects the categories to which they belong in the form of dependence relations oriented in the same direction. The consequence for the urbanism of an existing IS is that it is possible to describe which applications should offer their data to other applications in the IS, and for an IS being modified, it is possible to define which applications should offer their data to other applications in the IS.

Figure 5:
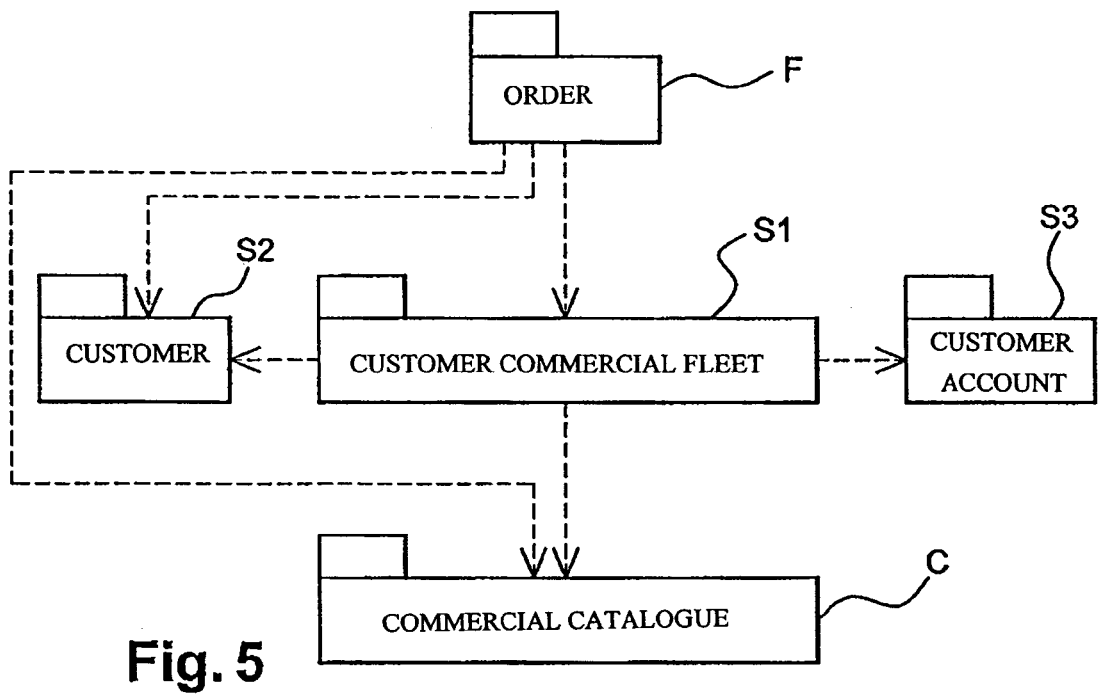
FIG. 5 is a diagram using the UML packeting notation and illustrating the example of the oriented categories diagram using the concept of the UML reference dependence relation.

Thus, the definition of a direction of dependence relations between categories related to the reference concept according to the principle presented above, provides a means of completing the categories diagram in FIG. 4 modeling IS data to obtain the diagram in FIG. 5. In the IS in this example, order applications implement the link between a customer's commercial fleet, and the customer and his account. The starting points of the dependence relations concerned are category S1 Customer Commercial Fleet, and their targets are category S2 Customer and category S3 Customer Account. Therefore, the application for which the deposit contains the reference data describing a customer must supply this data to the application for which the deposit contains the reference data describing a customer commercial fleet. Similarly, the application for which the deposit contains the reference data describing a customer account must supply this data to the application for which the deposit contains the reference data describing a customer commercial fleet.

This invention also relates to a method of locating reference data deposits, to support UML modeling principles defined in the above description with reference to FIGS. 1 to 5.

Figure 6:
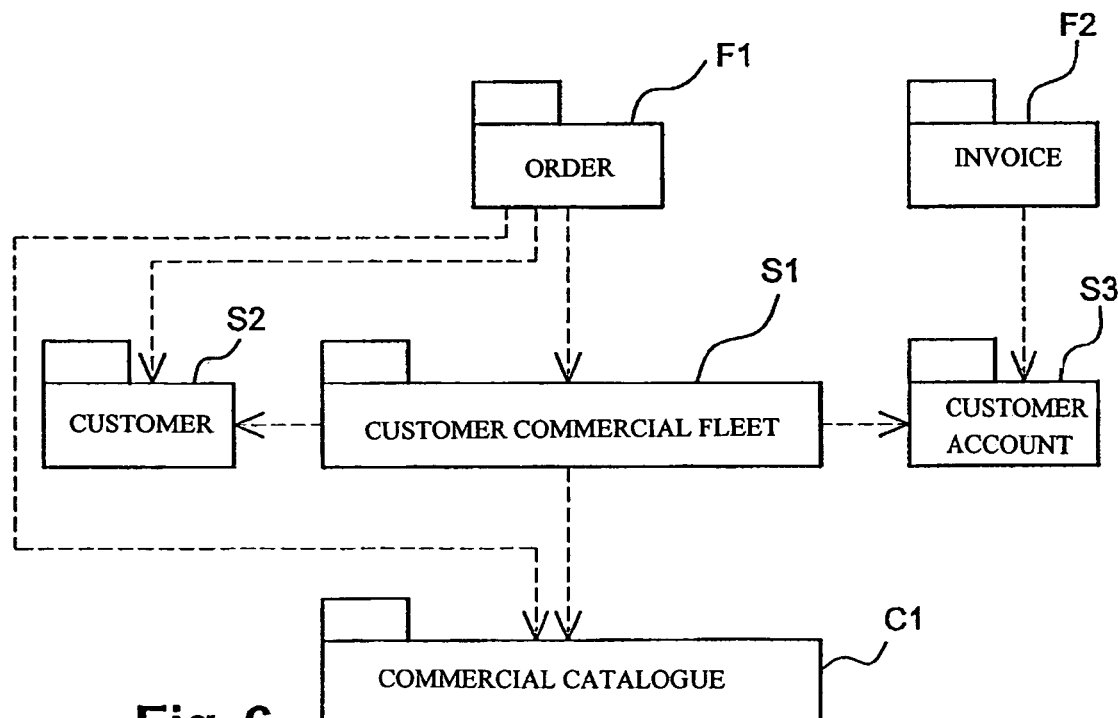
FIG. 6 is a diagram using the UML packeting notation and illustrating an example of a categories diagram built according to the principles of the invention, for implementing the method of localizing deposits of reference data for an IS.

This second aspect of the invention is described with reference to FIG. 6 illustrating a categories diagram related to a front office type software package that implements the order flow and an invoicing software package that implements the invoicing flow.

The localizing process according to this invention uses a category diagram as input, in which all dependence relations are oriented according to the previously defined principles. Therefore, the categories diagram in FIG. 6 is produced according to the principles defined by the UML model of the reference data of an IS according to this invention.

The categories in the categories diagram illustrated in FIG. 6 are defined as follows:

Two flow type categories F1 entitled Order, and F2 entitled Invoice.

Three stock type categories S1, S2 and S3, entitled Customer Commercial Fleet, Customer and Customer Account respectively.

A code type category C1, Commercial Catalogue.

For dependence relations, category F1 is related to stock type categories S1 and S2 and to the code type category C1, by dependence relations. According to the principles governing the orientation of dependence relations described above, the starting point for the direction of these relations originates with category F1 and its targets are categories S1, S2 and C1 respectively.

Category F2 is related to the stock type category S3, by a dependence relation. According to principles governing the orientation of dependence relations mentioned above, the starting point for the direction of this relation is category F2, and its target is category S3.

Category S1 is related by two dependence relations to stock type categories S2 and S3. According to the principles governing the orientation of dependence relations mentioned above, the starting point for the direction of these relations is category S1 and its targets are categories S2 and S3 respectively.

Finally, category S1 is related by a dependence relation to the code type category C1. According to the principles governing the orientation of dependence relations mentioned above, the direction of this relation originates in category S1 and its target is category C1.

The method according to the invention proposes to make an ordered path in the categories diagram, starting from flow type categories and working towards code type categories, in order to localize the position of reference data deposits corresponding to specialized concepts that belong to a same category.

Deposits of reference data are localized making use of an ordered path like that defined above, based on an algorithm that uses the following steps:

reiterate the following steps for each flow type category:
locate the reference data deposit associated with the said flow type category;
for each stock type category, target of at least one dependence relation starting from the said flow type category, and reiterate the following steps:—locate the reference data deposit associated with the said stock type category and give priority to the choice of the reference data deposit associated with the said flow type category, and;—for any other stock type category, target of at least one dependence relation originating with the said stock type category, localize the reference data deposit associated with the said other stock type category and give priority to the choice of the reference data deposit associated with the said stock type category;
for each code type category target of at least one dependence relation starting from the said flow type category, reiterate the following steps:—locate the reference data deposit associated with the said code type category and give priority to choosing the reference data deposit associated with the said flow type category;
for each stock type category, reiterate the following steps:
for each code type category, target of at least one dependence relation starting from the said stock type category, reiterate the following conditions:—localize the reference data deposit associated with the said code type category and give priority to the choice of the reference data deposit associated with the said stock type category, and;—for every other code type category, target of at least one dependence relation starting from the said code type category, localize the reference data deposit associated with the said other code type category and give priority to the choice of the reference data deposit associated with the said code type category.

Steps in the localizing algorithm consisting of localizing the reference data deposit associated with a category actually consist of identifying the application responsible for the reference data related to this category.

Thus, reconsidering the example in FIG. 6, a path for the categories diagram could be ordered as follows:
1. Category F1 Order
2. Category F2 Invoice
3. Category S1 Customer Commercial Fleet 4. Category S2 Customer
5. Category S3 Customer account
6. Category C Commercial Catalogue.

One localization of reference data deposits, made to support the above path and the algorithm as defined above, could be as follows:

For the two studied flow categories F1 and F2, the functional parameter of the two software packages is used to immediately associate, the reference data deposit related to category F1 Order with the front office software package, and the reference data deposit related to category F2 Invoice with the invoicing software package;

Since the reference data deposit related to category F1 Order is the front office software package, due to directions of dependence relations like those shown in FIG. 6, the reference data deposit related to category S1 Customer Commercial Fleet and the reference data deposit related to category S2 Customer are necessarily the deposit related to the front office software package;

For the same reason as mentioned above, the reference data deposit related to category S3 Customer Account is the invoicing software package deposit. For urbanism of this IS being created, it is thus interesting to note that the invoicing software package must supply the customer account to the front office software package, rather than the front office software package having to supply the Customer Commercial Fleet to the invoicing software package;

Since the reference data deposit related to category F1 Order is the front office software package, due to the directions of the dependence relations like those shown in FIG. 6, the reference data deposit related to category C1 Commercial Catalogue is the deposit for the front office software package.

The UML modeling method for reference data for an IS according to the invention, built using the principles defined above based on IS reference data, are used to create or modify the urbanism of an IS. This modeling can advantageously be used to determine which application must offer the reference data contained in its data deposit, and also relations between this reference data item and reference data in other deposits. It can also be used to localize reference data deposits for new data in an IS. This localizing of reference data deposits helps to determine which data deposits contain specific reference data, in other words which application is responsible for this deposit. Thus, when creating an IS, the localization proposed by the invention can advantageously be used to determined which applications have data deposits that will contain one or more reference data, during the functional urbanism phase.

What is claimed is:

1. A method of modeling reference data in an information system (IS) based on a Unified Modeling Language (UML) model of reference data for the information system listed in deposits of application data for the information system, wherein any reference data in the information system is defined by a specialized concept inheriting characteristics of a generic concept, comprising the steps of:
    grouping the said concepts into categories according to logical criteria;
    building a categories diagram in which the said categories are grouped according to a predefined typing of categories, the said categories being related to each other by UML dependence relations, each materialized in one reference data;
    making groups of generic concepts in the same category consistent with deposits of application data in the IS by applying the principle according to which reference data defined by specialized concepts inheriting generic concepts in a same category and possessing an identical specialization necessarily belong to the data deposit of a unique application;
    defining a direction for UML dependence relations relating the said categories to each other, the said direction of UML dependence relations depending firstly on typing of categories, and secondly on the deposit of the reference data containing the relation.

2. A method according to claim 1, characterized in that the grouping of categories according to a predefined typing consists of defining first categories related to flows (F) grouping generic concepts and specialized concepts that have a life cycle exactly corresponding to the life cycle of a process, second categories related to stocks (S) grouping generic concepts and specialized concepts that change state after a flow has been activated and that have a life cycle not limited to the life cycle of a process, and code (C) categories grouping generic concepts used to reference information related to flows or stocks.

3. A method according to claim 2, wherein a UML dependence relation between a flow (F) type category and a stock (S1, S2) type category is in the direction from the flow type category to the stock type category.

4. A method according to claim 2 wherein a UML dependence relation between a flow (F) type category or a stock (SI) type category and a code (C) type category is in the direction from the flow type category or the stock type category to the code type category.

5. A method set forth in claim 1, according to which two reference data are related to each other, the said relation resulting in a UML dependence relation between the categories to which the two generic concepts from which the specialized concepts corresponding to the said reference data are inherited belong, and the direction of the said UML dependence relation is determined such that the starting point is the category to which the generic concept corresponding to the reference data for which the data deposit comprises the reference data containing the relation between the said two reference data belongs.

6. A method for localizing deposits of reference data in an information system according to claim 1, further including a step for using a model of reference data in the information system a step defining an ordered path for the categories diagram, and a step localizing the reference data deposit associated with the said category.

7. A method according to claim 6, characterized in that the grouping of categories and the ordered path of the diagram is made from flow type categories to code type categories.

8. A method according to claim 7, characterized in that it includes:
    for each flow (F1, F2) type category, reiterating the step of:
    localizing the reference data deposit associated with the said flow type category;
    for each stock (S1, S2, S3) type category that is the target of at least one dependence relation originating from the said flow type category, reiterating the step of:
    localizing the reference data deposit associated with the said stock (S1) type category and giving priority to the choice of the reference data deposit associated with the said flow (F1) type category, and; for every stock (S2, S3) type category that is the target of at least one dependence relation originating from the said stock (S1) type category, localizing the reference data deposit associated with the said other stock (S2, S3) type category and giving priority to the choice of the reference data deposit associated with the said stock (S1) type category;

for each code (C1) type category that is the target of at least one dependence relation originating from the said flow (F1) type category, reiterating the step of:

localizing the reference data deposit associated with the said code (C1) type category and giving priority to the choice of the reference data deposit associated with the 15 said flow (F1) type category;

for each stock (S1, S2, S3) type category, reiterate the following steps:

for each code (C1) type category that is the target of at least one dependence relation originating from the said stock (S1) type category, reiterating the step of: localizing the reference data deposit associated with the said code (C1) type category and giving priority to the choice of the reference data deposit associated with the said stock (S . . . ) type category, and;

for every code type category that is the target of at least one dependence relation originating from the said code (C1) type category, localizing the reference data deposit associated with the said other code type category and give giving priority to the choice of the reference data deposit associated with the said code (C1) type category.

9. A method according to claim 6, characterized in that the step consisting of localizing the reference data deposit associated with a category consists of designating the application responsible for storage of the reference data related to the said category.

10. A method according to claim 3 wherein a UML dependence relation between a flow (F) type category or a stock (S1) type category and a code (C) type category is in the direction from the flow type category or the stock type category to the code type category.

11. A method as set forth in claim 2, according to which two reference data are related to each other, the said relation resulting in a UML dependence relation between the categories to which the two generic concepts from which the specialized concepts corresponding to the said reference data are inherited belong, and the direction of the said UML dependence relation is determined such that the starting point is the category to which the generic concept corresponding to the reference data for which the data deposit comprises the reference data containing the relation between the said two reference data belongs.

12. A method as set forth in claim 3, according to which two reference data are related to each other, the said relation resulting in a UML dependence relation between the categories to which the two generic concepts from which the specialized concepts corresponding to the said reference data are inherited belong, and the direction of the said UML dependence relation is determined such that the starting point is the category to which the generic concept corresponding to the reference data for which the data deposit comprises the reference data containing the relation between the said two reference data belongs.

13. A method as set forth in claim 4, according to which two reference data are related to each other, the said relation resulting in a UML dependence relation between the categories to which the two generic concepts from which the specialized concepts corresponding to the said reference data are inherited belong, and the direction of the said UML dependence relation is determined such that the starting point is the category to which the generic concept corresponding to the reference data for which the data deposit comprises the reference data containing the relation between the said two reference data belongs.

14. A method for localizing deposits of reference data in an information system according to claim 2, further including a step for using a model of reference data in the information system a step defining an ordered path for the categories diagram, and a step localizing the reference data deposit associated with the said category.

15. A method for localizing deposits of reference data in an information system according to claim 3, further including a step for using a model of reference data in the information system a step defining an ordered path for the categories diagram, and a step localizing the reference data deposit associated with the said category.

16. A method for localizing deposits of reference data in an information system according to claim 4, further including a step for using a model of reference data in the information system a step defining an ordered path for the categories diagram, and a step localizing the reference data deposit associated with the said category.

17. A method for localizing deposits of reference data in an information system according to claim 5, further including a step for using a model of reference data in the information system a step defining an ordered path for the categories diagram, and a step localizing the reference data deposit associated with the said category.

18. A method according to claim 14, characterized in that the grouping of categories and the ordered path of the diagram is made from flow type categories to code type categories.

19. A method according to claim 15, characterized in that the grouping of categories and the ordered path of the diagram is made from flow type categories to code type categones.

20. A method according to claim 16, characterized in that the grouping of categories and the ordered path of the diagram is made from flow type categories to code type categories.

21. A method according to claim 17, characterized in that the grouping of categories and the ordered path of the diagram is made from flow type categories to code type categones.

22. A method according to claim 18, characterized in that it includes:

for each flow (F1, F2) type category, reiterating the step of:

localizing the reference data deposit associated with the said flow type category;

for each stock (S1, S2, S3) type category that is the target of at least one dependence relation originating from the said flow type category, reiterating the step of:

localizing the reference data deposit associated with the said stock (S1) type category and giving priority to the choice of the reference data deposit associated with the said flow (F1) type category, and; for every stock (S2, S3) type category that is the target of at least one dependence relation originating from the said stock (S1) type category, localizing the reference data deposit associated with the said other stock (S2, S3) type category and giving priority to the choice of the reference data deposit associated with the said stock (S1) type category, localizing the reference data deposit associated with the said other stock (S2, S3) type category and giving priority to the choice of the reference data deposit associated with the said stock (S1) type category;

for each code (C1) type category that is the target of at least one dependence relation originating from the said flow (F1) type category, reiterating the step of:

localizing the reference data deposit associated with the said code (C1) type category and giving priority to the choice of the reference data deposit associated with the 15 said flow (F1) type category;

for each stock (S1, S2, S3) type category, reiterate the following steps:

for each code (C1) type category that is the target of at least one dependence relation originating from the said stock (S1) type category, reiterating the step of:

localizing the reference data deposit associated with the said code (C1) type category and giving priority to the choice of the reference data deposit associated with the said stock (S . . . ) type category, and; for every code type category that is the target of at least one dependence relation originating from the said code (C1) type category, localizing the reference data deposit associated with the said other code type category and giving priority to the choice of the reference data deposit associated with the said code (C1) type category.

23. A method according to claim 19, characterized in that it includes:

for each flow (F1, F2) type category, reiterating the step of:

localizing the reference data deposit associated with the said flow type category;

for each stock (S1, S2, S3) type category that is the target of at least one dependence relation originating from the said flow type category, reiterating the step of:

localizing the reference data deposit associated with the said stock (S1) type category and giving priority to the choice of the reference data deposit associated with the said flow (F1) type category, and; for every stock (S2, S3) type category that is the target of at least one dependence relation originating from the said stock (S1) type category, localizing the reference data deposit associated with the said other stock (S2, S3) type category and giving priority to the choice of the reference data deposit associated with the said stock (S1) type category;

for each code (C1) type category that is the target of at least one dependence relation originating from the said flow (F1) type category, reiterating the step of:

localizing the reference data deposit associated with the said code (C1) type category and giving priority to the choice of the reference data deposit associated with the 15 said flow (F1) type category;

for each stock (S1, S2, S3) type category, reiterate the following steps:

for each code (C1) type category that is the target of at least one dependence relation originating from the said stock (S1) type category, reiterating the step of:

localizing the reference data deposit associated with the said code (C1) type category and giving priority to the choice of the reference data deposit associated with the said stock (S . . . ) type category, and; for every code type category that is the target of at least one dependence relation originating from the said code (C1) type category, localizing the reference data deposit associated with the said other code type category and giving priority to the choice of the reference data deposit associated with the said code (C1) type category.

24. A method according to claim 20, characterized in that it includes: for each flow (F1, F2) type category, reiterating the step of:

localizing the reference data deposit associated with the said flow type category;

for each stock (S1, S2, S3) type category that is the target of at least one dependence relation originating from the said flow type category, reiterating the step of:

localizing the reference data deposit associated with the said stock (S1) type category and giving priority to the choice of the reference data deposit associated with the said flow (F1) type category, and; for every stock (S2, S3) type category that is the target of at least one dependence relation originating from the said stock (S1) type category, localizing the reference data deposit associated with the said other stock (S2, S3) type category and giving priority to the choice of the reference data deposit associated with the said stock (S1) type category, localizing the reference data deposit associated with the said other stock (S2, S3) type category and giving priority to the choice of the reference data deposit associated with the said stock (S1) type category;

for each code (C1) type category that is the target of at least one dependence relation originating from the said flow (F1) type category, reiterating the step of:

localizing the reference data deposit associated with the said code (C1) type category and giving priority to the choice of the reference data deposit associated with the 15 said flow (F1) type category; for each stock (51, S2, S3) type category, reiterate the following steps:

for each code (C1) type category that is the target of at least one dependence relation originating from the said stock (51) type category, reiterating the step of:

localizing the reference data deposit associated with the said code (C1) type category and giving priority to the choice of the reference data deposit associated with the said stock (S . . . ) type category, and; for every code type category that is the target of at least one dependence relation originating from the said code (C1) type category, localizing the reference data deposit associated with the said other code type category and giving priority to the choice of the reference data deposit associated with the said code (C1) type category.

25. A method according to claim 21, characterized in that it includes:

for each flow (F1, F2) type category, reiterating the step of:

localizing the reference data deposit associated with the said flow type category;

for each stock (S1, S2, S3) type category that is the target of at least one dependence relation originating from the said flow type category, reiterating the step of:

localizing the reference data deposit associated with the said stock (S1) type category and giving priority to the choice of the reference data deposit associated with the said flow (F1) type category, and; for every stock (S2, S3) type category that is the target of at least one dependence relation originating from the said stock (S1) type category, localizing the reference data deposit associated with the said other stock (S2, S3) type category and giving priority to the choice of the reference data deposit associated with the said stock (S1) type category, localizing the reference data deposit associated with the said other stock (S2, S3) type category and giving priority to the choice of the reference data deposit associated with the said stock (S1) type category;

for each code (C1) type category that is the target of at least one dependence relation originating from the said flow (F1) type category, reiterating the step of:

localizing the reference data deposit associated with the said code (C1) type category and giving priority to the choice of the reference data deposit associated with the 15 said flow (F1) type category;

for each stock (S1, S2, S3) type category, reiterate the following steps:

for each code (C1) type category that is the target of at least one dependence relation originating from the said stock (S1) type category, reiterating the step of:

localizing the reference data deposit associated with the said code (C1) type category and giving priority to the choice of the reference data deposit associated with the said stock (S . . . ) type category, and; for every code type category that is the target of at least one dependence relation originating from the said code (C1) type category, localizing the reference data deposit associated with the said other code type category and giving priority to the choice of the reference data deposit associated with the said code (C1) type category.

26. A method according to claim 14, characterized in that the step consisting of localizing the reference data deposit associated with a category consists of designating the application responsible for storage of the reference data related to the said category.

27. A method according to claim 15, characterized in that the step consisting of localizing the reference data deposit associated with a category consists of designating the application responsible for storage of the reference data related to the said category.

28. A method according to claim 16, characterized in that the step consisting of localizing the reference data deposit associated with a category consists of designating the application responsible for storage of the reference data related to the said category.

29. A method according to claim 17, characterized in that the step consisting of localizing the reference data deposit associated with a category consists of designating the application responsible for storage of the reference data related to the said category.

30. A method according to claim 22, characterized in that the step consisting of localizing the reference data deposit associated with a category consists of designating the application responsible for storage of the reference data related to the said category.

31. A method according to claim 23, characterized in that the step consisting of localizing the reference data deposit associated with a category consists of designating the application responsible for storage of the reference data related to the said category.

32. A method according to claim 24, characterized in that the step consisting of localizing the reference data deposit associated with a category consists of designating the application responsible for storage of the reference data related to the said category.

33. A method according to claim 25, characterized in that the step consisting of localizing the reference data deposit associated with a category consists of designating the application responsible for storage of the reference data related to the said category.

* * * * *